United States Patent [19]

Aurin

[11] 4,185,892
[45] Jan. 29, 1980

[54] APPARATUS FOR THE ADJUSTMENT OF TWO INTERSECTING OPTICAL AXES

[75] Inventor: Friedrich Aurin, Heidenheim-Schnaitheim, Fed. Rep. of Germany

[73] Assignee: Carl Zeiss Stiftung, Oberkochen, Fed. Rep. of Germany

[21] Appl. No.: 917,468

[22] Filed: Jun. 21, 1978

[30] Foreign Application Priority Data

Jun. 25, 1977 [DE] Fed. Rep. of Germany ....... 2728730

[51] Int. Cl.² .............................................. G02B 27/14
[52] U.S. Cl. ..................................................... 350/171
[58] Field of Search .............................. 350/169–174; 35/12 N; 358/104

[56] References Cited

U.S. PATENT DOCUMENTS 3,005,185  10/1961  Cumming et al. .................. 350/174
3,813,170  5/1974  Sears ................................. 350/172

*Primary Examiner*—Jon W. Henry
*Attorney, Agent, or Firm*—Stonebraker, Shepard & Stephens

[57] ABSTRACT

Adjustable optical apparatus having two optical systems both rotatable about a first axis of rotation. The first optical system has a first deflection element which, in addition to being rotatable about the first axis, is also rotatable about a second axis of rotation arranged at an angle to the first axis. The second optical system has a second light deflecting element which, in addition to being rotatable about the first axis, is also rotatable about a third axis of rotation at an angle to the first axis. The second optical system also includes a partially transmitting mirror, and a prism, both of which move bodily with the second light deflecting element around the first axis of rotation. The arrangement is useful in connection with a sighting system for gunnery control or weapon control, either in actual battle or in simulated situations such as in training apparatus.

9 Claims, 1 Drawing Figure

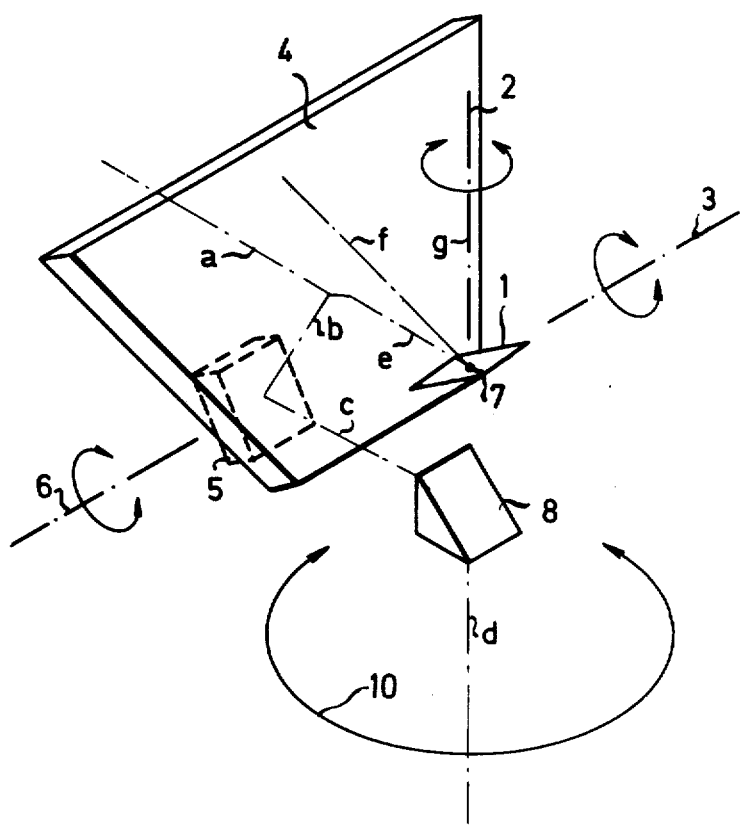

APPARATUS FOR THE ADJUSTMENT OF TWO INTERSECTING OPTICAL AXES

SUMMARY OF THE INVENTION

This invention relates to apparatus for displacing or adjusting two optical axes which belong to two different optical systems or partial systems and which intersect in each position at the same point, to swing or rotate the optical axes about two axes of rotation for each optical axis.

A device for the displacing of two optical axes which intersect at a point is used in optical instruments which have different sighting windows with one common reference point. Thus for instance the reference point for the optical fire directors of an armored vehicle is the point of intersection of the cradle axis and the weapon axis. In the case of such armored vehicles, the windows of optical fire directors lie at a distance up to about 850 millimeters vertically and laterally from such a reference point. In a terrain model serving for the training of the crew of such a vehicle, in a customary scale of 1:160, this difference corresponds to about 130 model meters. For bringing together the windows of the optical fire director or gunnery director or control, there is thus required an aiming system in which all angular movements of the vehicle during travel can be simulated.

An object of the invention is to provide a device for superimposing the two optical axes which intersect at a point and which can, independently from each other, effect rotations about this point, around two axes of rotation each.

This object is achieved in accordance with the invention by providing for each of the optical systems with which the optical axes to be displaced are associated, a beam deflection element which is rotatable about an axis of rotation which is common to both systems and also rotatable about a separate axis of rotation associated individually with each system. In addition, means is further provided so that a mirror image of the doubly rotatable deflection element of one system appears at the locus of the doubly rotatable deflection element of the other system.

Because of the penetration of one doubly rotatable optical deflection element by the mirror image of the other doubly rotatable optical deflection element, the result is obtained that the optical axes of the two systems have a common point of intersection at every possible position of the rotatable elements without any interference with each other's movements. If there were physical penetration of the rotatable elements rather than merely optical penetration by light beams, such disturbance-free movement would not be possible.

One advantageous embodiment of the invention is characterized by the fact that the doubly rotatable optical deflection element of one optical partial system is in the form of a flat or plane mirror, and it is arranged for rotation both around a first axis of rotation common to both optical systems and around a second axis of rotation individual to this particular optical system; and also the doubly rotatable optical deflecting element of the other or second optical system, which may also be in the form of a flat mirror, is arranged on a rotary platform together with a deflection prism and a partially transmitting mirror, the platform being rotatable about the first mentioned axis of rotation to carry with it the doubly rotatable deflection element of the second system as well as the partially transmitting mirror and the prism. Moreover, means is provided to permit the doubly rotatable deflection element of the second optical system to rotate around an individual axis of rotation associated with it. Also, the partially transmitting mirror is inclined at an angle of about 30 degrees to the common axis of rotation of the two systems.

The partially transmitting mirror which constitutes part of the second system can be in the form of a flat or plane mirror, or may have a mirror surface formed as a surface of revolution concentric with the common axis of rotation of the two optical systems. The advantage of the last mentioned embodiment, using a surface of revolution as the shape of the partially transmitting mirror, is that with this arrangement, the range of adjustment of the device can be expanded.

An advantage obtained with the invention is that, for example with an optical aiming system for the guns of armored vehicles, all angular movements of the vehicle during travel can be simulated, and that accidental errors upon optical horizontal and azimuth directing can be kept sufficiently small.

BRIEF DESCRIPTION OF THE DRAWING

The single view is a schematic illustration of apparatus in accordance with one embodiment of the present invention.

DETAILED DESCRIPTION

Referring now to the drawing, the first optical system or partial system includes a first rotatable optical deflector element 1 in the form of a flat mirror. This element 1 is mounted for rotation about a first axis of rotation 2 and also about a second axis of rotation 3 which is at a substantial angle to the first axis 2, these 2 axes preferably intersecting each other the intersection of the two axes being at a point of the reflecting surface of the deflecting element 1, such as the point 7.

The second optical system or the partial system includes a partially transmitting mirror 4, a second doubly rotatable deflector element 5 on one side of the partially transmitting mirror 4, and a deflecting prism 8 on the opposite side of the partially transmitting mirror 4 from the deflecting element 5, so that the mirror 4 is interposed between the elements 5 and 8. The three elements, 4,5 and 8 are all mounted on a platform or turntable which rotates about the previously mentioned rotation axis 2. This rotary platform is not illustrated in detail, as it may be of any conventional known kind, but is schematically indicated by the partial circle 10. Because of the mounting of the elements 4,5, and 8 upon the rotary platform 10, it is seen that all these elements 4,5, and 8 are rotatable about the first axis of rotation 2 about which the first deflection element 1 is also rotatable. In addition, the second doubly rotatable deflection element 5, preferably formed as a plane or flat mirror, is also separately rotatable about its own individual axis of rotation 6 which is at a substantial angle to the axis 2, preferably intersecting the axis 2 and being perpendicular to it.

Seen in the direction of the incident light, the deflection mirror 5 is arranged in front of the partially transmitting mirror 4, and this partially transmitting mirror 4 is arranged in front of the deflection mirror 1 and the deflection prism 8. The partially transmitting mirror 4 is inclined at an angle of preferably about 30 degrees to the axis of rotation 2. The mirror image of mirror 5 penetrates the mirror 1 in such a way that the point of intersection of the optical axes b and c appears in the point 7.

As already mentioned above, the partially transmitting mirror 4 may be a flat or plane mirror. Also, as an alternative arrangement, it may be formed as a surface of rotation or revolution concentric with the axis 2. This has the advantage of increasing the range of the adjustment of the device.

A beam of light with the component sections or portions a, b, c, and d is associated with the line of sight of the apparatus. The component section d leads to an observer. On the partially transmitting mirror 4 the beam e is split off and passes through the point 7 on the mirror 1 constituting the first retatable deflecting element. For a second observer, a beam g extends along the line of sight.

The beam of light f is deflected by the mirror 1 and passes through the point 7 in every position of the mirror. The beam e represents the extension of the beam a and also passes, in every possible swung or adjusted position of the elements 4,5, and 8, through the point 7. Normally a range of swing of plus or minus 45 degrees is provided. In the illustrative embodiment of the invention for optical fire directors or gunnery purposes, a reference point corresponding to the point 7 is obtained as a point of intersection of a cradle axis and weapon or gun axis.

What is claimed is:

1. Adjustable optical apparatus comprising a first optical system including a first optical beam deflection element mounted for rotation about a first axis of rotation and also mounted for rotation about a second axis of rotation extending at a substantial angle to said first axis, a second optical system including a second optical beam deflection element mounted for rotation about said first axis and also mounted for rotation about a third axis of rotation spaced from said second axis and extending at a substantial angle to said first axis, and reflecting means for producing an image of the beam deflection element of one optical system at a locus of the beam deflection element of the other optical system in all adjusted positions of said optical systems about their axes of rotation.

2. The invention defined in claim 1, wherein said first beam deflection element is a flat mirror.

3. The invention defined in claim 2, wherein said second beam deflection element is also a flat mirror.

4. The invention defined in claim 3, further comprising a partially transmitting mirror and a prism both mounted to rotate concurrently with said second beam deflection element about said first axis, and so arranged that an incoming beam of light falling on said partially transmitting mirror will be split thereby, part of the incoming beam will pass through said partially transmitting mirror and fall upon said first beam deflection element and be deflected thereby, and another part of the incoming beam will be reflected by said partially transmitting mirror to fall upon said second beam deflection element and be deflected thereby to pass through said partially transmitting mirror and to said prism and be deflected by said prism.

5. The invention defined in claim 4, wherein the beam deflected by said prism is deflected along a path substantially aligned with but in the opposite direction from the beam deflected by said first beam deflection element.

6. The invention defined in claim 4, wherein said partially light transmitting mirror is arranged at an angle of approximately 30 degrees to said first axis of rotation.

7. The invention defined in claim 4, wherein said partially light transmitting mirror has a reflecting surface which is substantially plane.

8. The invention defined in claim 4, wherein said partially light transmitting mirror has a reflecting surface which is formed substantially as a surface of revolution concentric with said first axis of rotation.

9. The invention defined in claim 1, further comprising a partially transmitting mirror and a prism both mounted to rotate concurrently with said second beam deflection element about said first axis.

* * * * *